March 1, 1932.  R. A. HEISING ET AL  1,847,089
RADIO RECEIVING SYSTEM
Filed Oct. 9, 1925

Inventors:
Raymond A. Heising.
John F. Farrington.
by E. W. Adams  Att'y.

Patented Mar. 1, 1932

1,847,089

UNITED STATES PATENT OFFICE

RAYMOND A. HEISING, OF MILLBURN, NEW JERSEY, AND JOHN F. FARRINGTON, OF FLUSHING, NEW YORK, ASSIGNORS TO BELL TELEPHONE LABORATORIES, INCORPORATED, OF NEW YORK, N. Y., A CORPORATION OF NEW YORK

RADIO RECEIVING SYSTEM

Application filed October 9, 1925. Serial No. 61,419.

This invention relates to radio receiving apparatus and more particularly to a method and means for minimizing the effects of fading in short wave radio communication.

It has been observed that radio waves from a given transmitting station, particularly those of very high frequency, are sometimes received at a distant radio receiving station from all possible directions. This may be due to different parts of a wave which is radiated over a rather wide range of directions from a transmitting station being received simultaneously at one point from different directions, or it may be caused by a change in the direction from which a single wave is received. Whatever may be the physical condition by which this effect is produced, the effect is herein referred to as a plurality of waves received from different directions to simplify the description, and as such is intended to include the case where a single wave changes in direction.

Waves coming from the various directions have been observed to fade at different times in apparently independent phase relationship and do not generally attain maximum and minimum values of intensity at the same time. Consequently, by combining waves from a plurality of directions, it is possible to decrease the intensity variation of the resultant signal.

It is an object of this invention to minimize the effect of fading in short wave radio communication.

Another object is to provide for the reception of short wave radio signals in such manner that the effect of fading is substantially reduced.

These objects and others which will be apparent as the nature of the invention is disclosed, are accomplished, in a radio receiving system employing directive loop antennæ, by receiving separately, waves coming to the station from various directions, detecting or converting the frequency of these waves, and combining the resultant waves in suitable apparatus from which a signal may be obtained.

Figure 1:
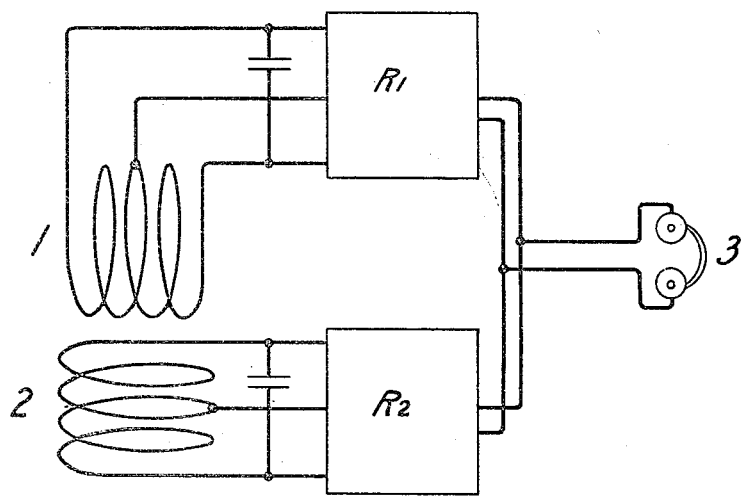
Figure 2:
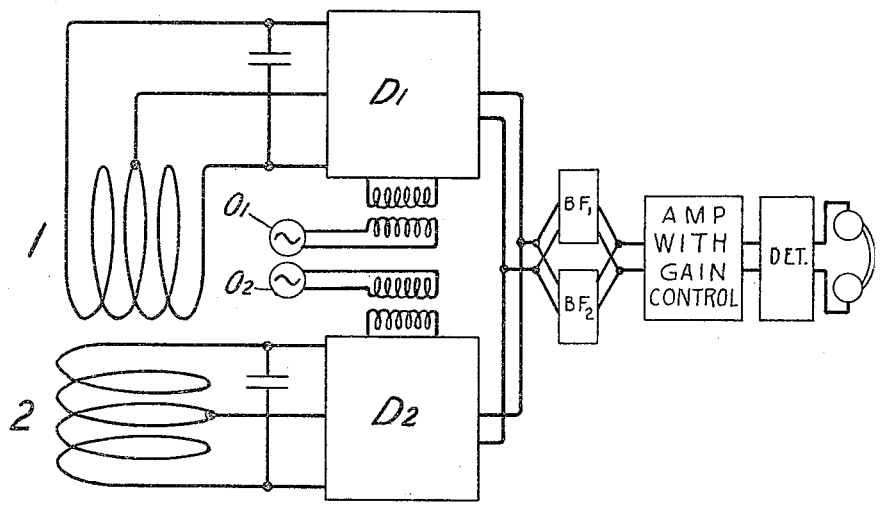

Although the novel features which are believed to be characteristic of this invention will be pointed out with particularity in the claims appended hereto, the invention itself, its objects and advantages, the manner of its organization and the mode of its operation will be better understood by referring to the following description taken in connection with the accompanying drawings forming a part thereof, in which Fig. 1 illustrates one embodiment of this invention, employing a plurality of radio receivers, and Fig. 2 illustrates a modified form thereof in which certain of the apparatus incorporated in the various receivers shown in Fig. 1 have been combined in a single unit.

Referring to the figures more in detail, Fig. 1 discloses a plurality of loop antennæ 1 and 2 which are adapted to receive waves coming from directions differing in angle by substantially 90°. Waves received by loops 1 and 2 are impressed upon receivers $R_1$ and $R_2$, respectively, which are adapted to detect the resultant signal and amplify if desired. The low frequency signals in the output circuit of receivers $R_1$ and $R_2$ are combined to actuate a single signal responsive means 3.

The specific form of receiving apparatus constitutes no part of this invention, consequently no particular form has been described. One type of receiving apparatus which may be used, however, is disclosed in a copending application of R. A. Heising, Serial No. 41,708, filed July 6, 1925, and issued September 15, 1931, as U. S. Patent No. 1,823,360. The apparatus disclosed therein comprises a double detection receiving set to which is added an intensity regulator for the purpose of maintaining the detected signal substantially constant in amplitude, irrespective of the amplitude variations of the wave impressed upon the receiving antenna. Although the use of an automatic intensity control is not essential to this invention, it may be advantageously employed if desired to reduce the signal variations in the output circuit of the various receivers.

In the arrangement shown in Fig. 2, loop antennæ 1 and 2 are arranged at an angle of 90° as described in connection with Fig. 1. Waves received by these antennæ are impressed up detectors $D_1$ and $D_2$ respectively, comprising the first detectors of a double detection receiving system. Oscillators $O_1$ and $O_2$ supply local oscillations to detectors $D_1$ and $D_2$, respectively, wherein they are combined with the incoming waves to produce currents of different intermediate frequencies which preferably differ by only a slight amount so that they may be transmitted through the various selective circuits of the intermediate frequency amplifier.

Currents in the output circuits of detectors $D_1$ and $D_2$ are impressed upon an amplifier, adapted to amplify the two waves of a slightly different frequency, and are rectified in the second detector. A filter adapted to select the intermediate frequency waves may be included at any point in the intermediate frequency amplifier. A single band pass filter may be employed if the frequencies of the two waves differ but slightly. If the frequency difference is comparatively large, a circuit having two degrees of freedom may be used or two separate band pass filters may be connected in parallel as shown at $BF_1$ and $BF_2$ to pass the two waves. An amplification control may be incorporated with the intermediate frequency amplifier and detector to still further reduce the variations in the amplitude of the detected signal which is impressed upon signal responsive means 3. The intermediate frequency amplifier, filter, the second detector and the gain control device may each be of any well known form and are illustrated only in conventional form.

This system has been found to substantially reduce signal variations since the waves received by antennæ 1 and 2 fade separately and do not reach points of maximum and minimum intensity at the same time. By receiving and converting in separate apparatus the various waves coming from directions differing by an angle of substantially 90° and combining the converted waves, the resultant signal fades to a much less degree than either of the separate signals.

In order to operate in this manner the two signals should be separately detected. If the intermediate frequency waves of the double detection system of Fig. 2 are of different frequencies, they may be separately detected in the same detector and the detected waves combined to actuate a single signal responsive means. A possible explanation of the reason for detection before combining the waves is that a relatively small linear displacement, caused by the two waves travelling paths of different lengths, is sufficient to cause the high frequency waves to arrive at the receiving station in phase opposition. The linear displacement necessary to produce phase opposition of the two low frequency signals would, however, be relatively large, being of the order of 150 kilometers for a 1000 cycle signal.

Although an automatic amplification control is adapted to compensate for certain irregularities in the received waves, there is a certain maximum gain which the apparatus is capable of producing, consequently, should the signal fade below a minimum given value, an amplification control is ineffective to maintain a constant intensity. By combining the detected signals before applying the automatic amplification control, however, as shown in Fig. 2, the signal applied to the control is less likely to fall below the given maximum value than would be the case if the gain control is applied to the various signals separately.

Obviously, any number of separate receiving means may be employed to further reduce the intensity variation and the respective loop antennæ may be arranged at any convenient angle to obtain this effect. Although an arrangement at angles of 90° has been found satisfactory for this purpose, other arrangements may be used if desired, the particular angle most advantageous being determined by experiment in the particular case. Loop antennæ have been shown by way of illustration but any other type of directive antennæ may be employed to produce the same effect.

Although this invention has been shown and described as applied to a particular system, it is not to be limited thereto but only in accordance with the scope of the invention as defined by the following claims.

What is claimed is:

1. In a radio receiving system, a plurality of loop antennæ adapted to receive waves of the same frequency arriving from different directions in proximity to means for separately converting the frequency of said waves, means for additively combining the converted waves, and means for obtaining the signal from the combined wave.

2. In a radio receiving system, two loop antennæ, in proximity to the receiving station adapted to receive waves of the same frequency, arranged at an angle of substantially 90°, detecting means separately associated with each of said antennæ, and means for additively combining the output current of said detecting means.

3. In a radio receiving system, two loop antennæ arranged at an angle of substantially 90°, demodulators associated therewith, sources of local oscillations of different frequencies, means for impressing oscillations from said sources upon said demodulators wherein they are combined with received waves to produce waves of beat frequencies, means for amplifying said beat frequency waves, means for detecting these waves to produce a signal, a gain control for maintaining the intensity of said signal substantially constant irrespective of the variations of the received waves, and means for impressing said signal upon a signal responsive device.

4. A method of radio communication which comprises directionally receiving at a radio receiving station waves radiated from a given transmitting station arriving from one direction, directionally receiving at the same receiving station waves radiated from the same transmitting station arriving from another direction but of the same frequency as said first wave, separately detecting said waves, and additively combining and obtaining a signal from the detected waves.

5. In a radio communicating system, including a radio receiving station having a receiver and a plurality of directive antennæ in proximity thereto, the method which comprises receiving a part of a wave arriving from one direction, directionally receiving a different part of said first mentioned wave arriving from a different direction, separately detecting the waves received from the different directions, and additively combining the detected waves to produce a signal.

In witness whereof, we hereunto subscribe our names this 8th day of October A. D. 1925.

RAYMOND A. HEISING.
JOHN F. FARRINGTON.